US007020838B2

(12) United States Patent
Tsykora

(10) Patent No.: US 7,020,838 B2
(45) Date of Patent: Mar. 28, 2006

(54) SYSTEM AND METHOD FOR IDENTIFYING LINE BREAKS

(75) Inventor: Anatoliy V. Tsykora, Waltham, MA (US)

(73) Assignee: VistaPrint Technologies Limited, Hamilton (BR)

( * ) Notice: Subject to any disclaimer, the term of this patent is extended or adjusted under 35 U.S.C. 154(b) by 601 days.

(21) Appl. No.: 10/235,084

(22) Filed: Sep. 5, 2002

(65) Prior Publication Data

US 2004/0049735 A1 Mar. 11, 2004

(51) Int. Cl.
*G06F 17/00* (2006.01)
(52) U.S. Cl. .................. 715/513; 715/524; 715/526
(58) Field of Classification Search ............... 715/513, 715/527, 503, 523, 521, 531, 526; 707/9, 707/102; 709/203, 218
See application file for complete search history.

(56) References Cited

U.S. PATENT DOCUMENTS

| | | | | | |
|---|---|---|---|---|---|
| 5,897,644 | A | * | 4/1999 | Nielsen | 715/513 |
| 5,978,819 | A | * | 11/1999 | Berstis | 715/513 |
| 6,003,048 | A | * | 12/1999 | Fallside | 715/513 |
| 6,247,018 | B1 | * | 6/2001 | Rheaume | 707/102 |
| 6,510,441 | B1 | * | 1/2003 | Kenninga | 715/521 |
| 6,631,375 | B1 | * | 10/2003 | Jecha et al. | 707/9 |
| 6,766,495 | B1 | * | 7/2004 | Bates et al. | 715/531 |
| 2003/0014445 | A1 | * | 1/2003 | Formanek et al. | 707/526 |
| 2004/0177323 | A1 | * | 9/2004 | Kaasila et al. | 715/513 |
| 2004/0205568 | A1 | * | 10/2004 | Breuel et al. | 715/513 |

OTHER PUBLICATIONS

P. Carey,"DHTML Tutorial 2: Creating Web Pages with HTML and Dynamic HTML", 2001, pp. 1-7, downloaded from http://web.archive.org/web/20010504150426/http://www.course.com/downloads/newperspectives/crweb2/dhtml/DHTML02.html.*

* cited by examiner

*Primary Examiner*—William Bashore
*Assistant Examiner*—J H Blackwell
(74) *Attorney, Agent, or Firm*—Robert Dulaney

(57) ABSTRACT

Method, system, and computer code for preparing markup language documents containing multi-line text elements for WYSIWYG printing. The document is rendered in a prepress server system by a duplicate of the browser that was used to prepare the document in the client system. User-imposed line breaks are identified by reviewing text elements for break characters. Browser-imposed line breaks are identified by comparing spatial location information from the browser for each sequential pair of characters in a text element. The collective line break information is used to ensure that the line breaks viewed by the user are maintained when the document is converted to a prepress system.

4 Claims, 7 Drawing Sheets

SYSTEM AND METHOD FOR IDENTIFYING LINE BREAKS

FIELD OF THE INVENTION

This invention relates generally to processing electronic documents and more specifically to converting multi-line markup language documents into a prepress format.

BACKGROUND OF THE INVENTION

Software applications designed to locate and display World Wide Web ("Web") pages are in widespread use. Commonly referred to as Web browsers, two of the most popular of such applications are Internet Explorer from Microsoft Corporation and Netscape Navigator from Netscape Communications Corporation. These browsers are capable of displaying documents written in the common standard markup languages in use today.

HTML (Hypertext Markup Language) remains a very common and popular authoring and presentation language for creating Web materials. The HTML standard, however, was originally based on the idea that an HTML document would remain static after being rendered in the browser. To allow for elements in an HTML page to be controllable after the page is rendered, Microsoft and Netscape browsers have incorporated support for the idea of DHTML (Dynamic HTML) into their browsers. DHTML is not actually a language, but is the combination and interaction of several Web-related standards, including HTML, CSS (Cascading Style Sheets), DOM (Document Object Model), and scripting.

Another development was the creation of the XML (eXtensible Markup Language) standard. XML is also not a language, but is a metalanguage or set of rules that allow the creation of other markup languages. XML allows developers to create markup languages that are more versatile and powerful than HTML. One of the standard XML languages that are now in common use is XHTML (eXtensible HTML). The XHTML language standard was developed by adapting the HTML standard to meet the requirements of XML. The DHTML standard also now accommodates XHTML. Specifications and descriptions for HTML, XML, XHTML and other Web-related open technology standards are available on the Web from the World Wide Web Consortium at http://www.w3c.org.

Many enterprises have recognized the commercial opportunities presented by the ability to create and edit documents in the browser and have undertaken to capitalize on it by developing products and services supported or enabled by software applications running in the browser. To facilitate and promote the development of browser-compatible software applications, browser vendors typically implement and make readily available an API (application program interface) of standard routines, protocols and tools for use by application developers.

One of the many applications that has emerged for this technology is Web-based document preparation allowing a user, using the user's browser, to design, edit and proof a customized WYSIWYG (what you see is what you get) document, prepare an order for printing of the document, and transmit the document to a remote server for printing on an appropriate printing system. The term "document" as used herein refers to an electronic file intended for eventual printing by any known printing process on any printable medium, including, but not limited to, paper, cloth, glass, plastic, rubber, or wood.

For many types of products, Web-based design and editing offers the potential to substantially improve the speed and efficiency of the print job preparation process, which has traditionally involved either not having the opportunity to review the actual appearance of the printed product in advance or the time consuming steps of designing the layout, creating the proofs, reviewing and correcting the proofs, incorporating corrections or modifications, re-reviewing the proofs, purchase order completion, and eventually transmission to the printing facility.

One prior art system for performing browser-based document creation and editing is disclosed in U.S. Pat. No. 6,247,011 entitled "Computerized Prepress Authoring for Document Creation". U.S. Pat. No. 6,247,011 discloses a system wherein an HTML document editing tool is downloaded to the user browser. User information is entered in a document preparation template and is displayed to the user on the user's display monitor. The HTML version of the document is uploaded to the server where it is converted to an image representing the appearance of the final printed document. The image is then downloaded back to the user's system. In the U.S. Pat. No. 6,247,011 system, the HTML version is for general layout and design of the document. The converted image version of the document, which would typically not be identical to the HTML version, is the version used for user review and approval.

Another system for browser-based document creation is described in copending and commonly owned application Ser. No. 09/557,571 entitled "Managing Print Jobs", which is hereby incorporated by reference. Application Ser. No. 09/557,571 discloses a document preparation system comprising a downloadable editing application that allows a user to design and proof WYSIWYG documents in XHTML in the user's browser and server-side applications that convert the XHTML version of the document received from the browser to a prepress version in preparation for printing on a high-resolution printing device. This application does not expressly discuss the problems related to generating a WYSIWYG prepress version of a markup language document containing one or more multi-line text areas.

WYSIWYG functionality is highly important to many document developers and has for some time been available to computer users in modern word processing, desktop publishing and other applications. The successful application of browser-based XHTML document editing to the preparation of WYSIWYG materials containing multi-line text fields, however, has proved to be difficult. This has made browser-based editing tools generally unsuitable for the WYSIWYG creation of printed products having text lines longer than a few words.

A primary reason for this difficulty with longer text strings is that the XHTML standard does not require, and the browser does not implement, any tag or other indicia showing when or where a string of characters has reached the end of a line and been wrapped by the browser to the next line. The text wrapping decision and control resides in the browser, which dynamically breaks a lengthy string of text according to the width of the text area made available to the browser. If the precise location of all line breaks in the document as it was viewed and approved by the user are not known, a WYSWIG result cannot be guaranteed when the XHTML document is converted into a prepress format.

Therefore, in the prior art, the typical approaches taken in connection with proofing documents created in the browser were to either upload the document to a server for conversion to a bitmap image which was then downloaded back to the user for review or to simply notify the user that the final printed version might differ from the version viewed on the user's screen. The former approach can generate repetitive network traffic to and from the user's computer and server conversion activity while the document is being prepared. The latter is unsatisfactory to the user because the user cannot verify the appearance of the finished product. Both approaches can lead to user frustration and dissatisfaction.

SUMMARY OF THE INVENTION

The invention addresses the above-identified shortcoming by providing a system and method for identifying browser-imposed line breaks in multi-line text elements. A markup language document is received by a server that supplies the document to a browser that is a duplicate of the client browser used to create the document. Each text element is reviewed once to identify user-inserted line breaks and a second time to identify browser-imposed line breaks.

The invention takes advantage of the browser's ability to provide positional information for segments of the text string. The location of line breaks inserted by the browser are identified by comparing positional information for segments of the text string.

DETAILED DESCRIPTION OF THE PREFERRED EMBODIMENT

Figure 1:
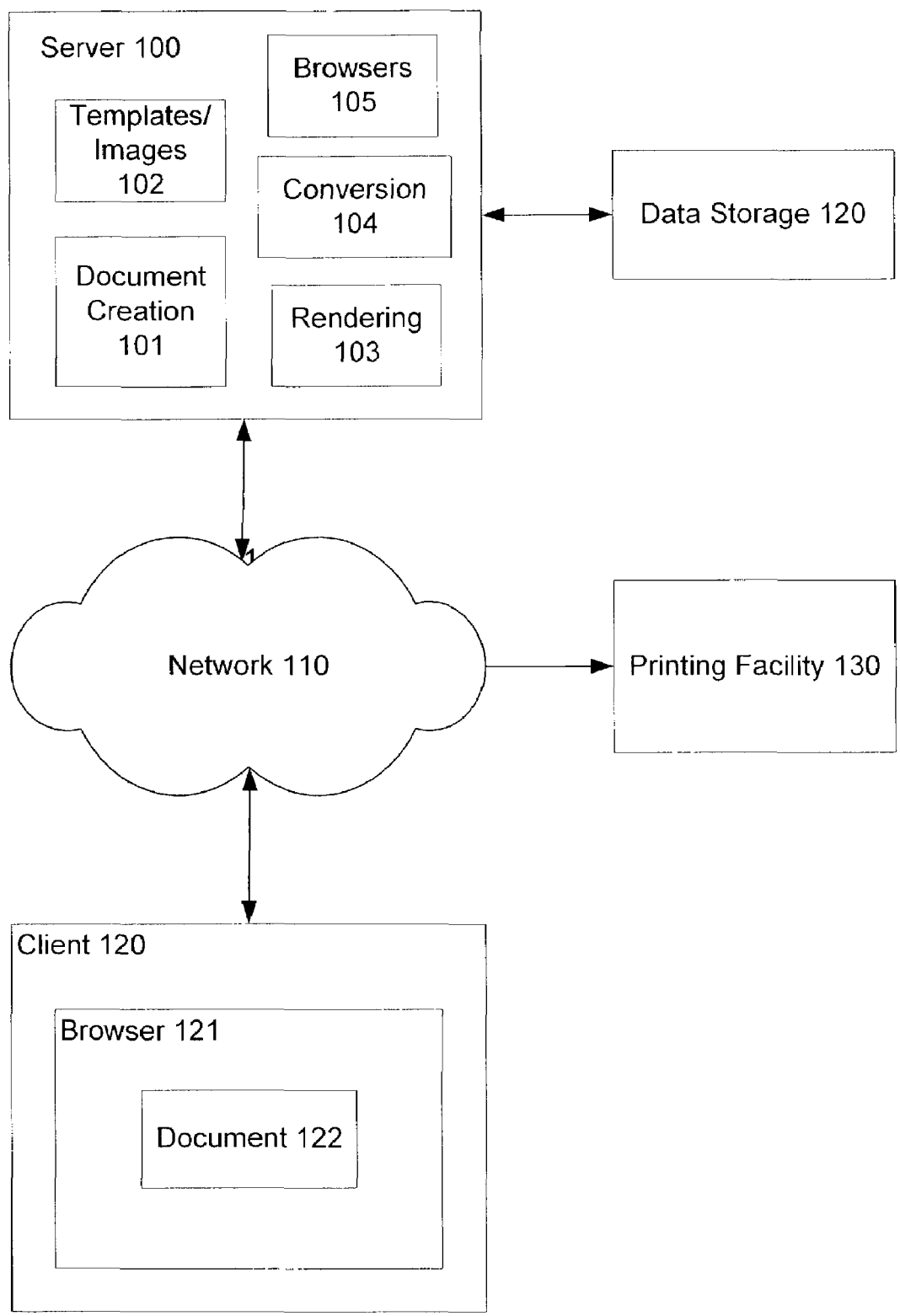
FIG. 1 is a block diagram of a system embodying the invention.

FIG. 1 is a diagram of a system for employing the invention. Server 100 is a Web server having a universal resource locator and being adapted to permit computers having access to the Web, such as Client 120, to access server 100 and download Web pages and other materials. While shown in FIG. 1 as a single unit, it will be understood that server 100 may in fact be comprised of a plurality of individual processors or separate computers, which may be either in the same or in different geographical locations, operating cooperatively so as to provide computational and informational support to Web users. In the preferred embodiment shown in FIG. 1, Client computer 120 is a PC or similar computer having a processor, a memory, a display, and input devices, such as a keyboard and a mouse, however, it will be understood that the invention is applicable to other devices capable of displaying XHTML documents, such as palmtop computers, tablet computers, Web-enabled telephones, and personal digital assistants (PDAs). Similarly, while XHTML is referred to throughout, the invention could also be usefully employed with any other markup languages where a text string does not have embedded indications of text wrapping. While FIG. 1 depicts server 100 and client 120 communicating via network 110, it will be understood that the invention is not limited to network applications, but can be employed with other situations where a WYSIWYG relationship between the HTML document and the final printed product is desired.

Server 100 includes a downloadable document creation program 101 for downloading to and execution on Client 120 in Browser 121. In a preferred embodiment, Browser 121 is Microsoft Explorer. Server 100 may also make available a plurality of downloadable document templates and images 102 to assist client 120 in creating document 122. The human operator of client 120 will be controlling the detailed creation of document 122 using the keyboard and/or mouse of Client 120 and observing the state of the document on the display of client 120. When document 122 is satisfactory to the operator, the operator transmits document 122 over network 110 to server 100. Server 100 will typically store document 122 and related customer and system information in data storage 120, for example one or more disk drives or a disk array, for a period of time until all pre-printing conditions are met, such as completion of the ordering information, approval or clearance of the customer's form of payment, and scheduling of the printing system.

Prior to printing, document 122 will be retrieved from Data Storage 120 and processed to insure that the text arrangement as viewed and approved by the user is reproduced faithfully on the printed product. Because the design and operation of commercially available browsers varies between browser vendors and between different browser versions from the same vendor, Server 100 maintains access to a copy of every browser version with which Document Creation 101 is compatible. These browsers are collectively identified as Browsers 105. As will be described below, Conversion 104 reviews the text elements of the XHTML document and identifies the location of all line breaks prior to supplying the document to Rendering 103 for conversion to a prepress format. After conversion to a prepress format by Rendering 103, Server 100 can forward the converted document to Printing Facility 130 over network 110, either alone or in combination with other print jobs.

In accordance with XHTML standards, text in the document will be contained in one or more text elements. Each element has associated parameters and attributes that define the structure and content of the element. These include both the physical features of the element, such as the height and width of the text area and the absolute or relative spatial location of the element within the document, as well as the specification of any text content of the element, such as font type, font size, font color, and any font attributes such as bolding and italics. A document might contain only a single text element or might contain a large number of such elements. Some individual text elements in a document may be empty while other text elements may include combinations of visible characters, spaces characters, and new line control characters in any sequence. A string of characters in a text element may be relatively short, occupying only a single line, or may be quite lengthy, requiring that the browser wrap the text onto multiple lines. The invention described herein is particularly concerned with identifying browser-generated line breaks in multi-line text strings.

The browser creates and maintains an invisible bounding rectangle that conceptually surrounds the lines of text in an element. This rectangle represents the area within which the characters are rendered. The rectangle is sized to accommodate the characters contained in the text, including all possible character effects and decoration such as subscripting, superscripting, and underlining. The browser can supply various properties describing the bounding rectangle, such as the rectangle's height and width. The browser can also provide these properties for the bounding rectangle of any subset of the text in a text element. In a preferred embodiment, values for these properties are obtained using the TextRange object.

Figure 2A:
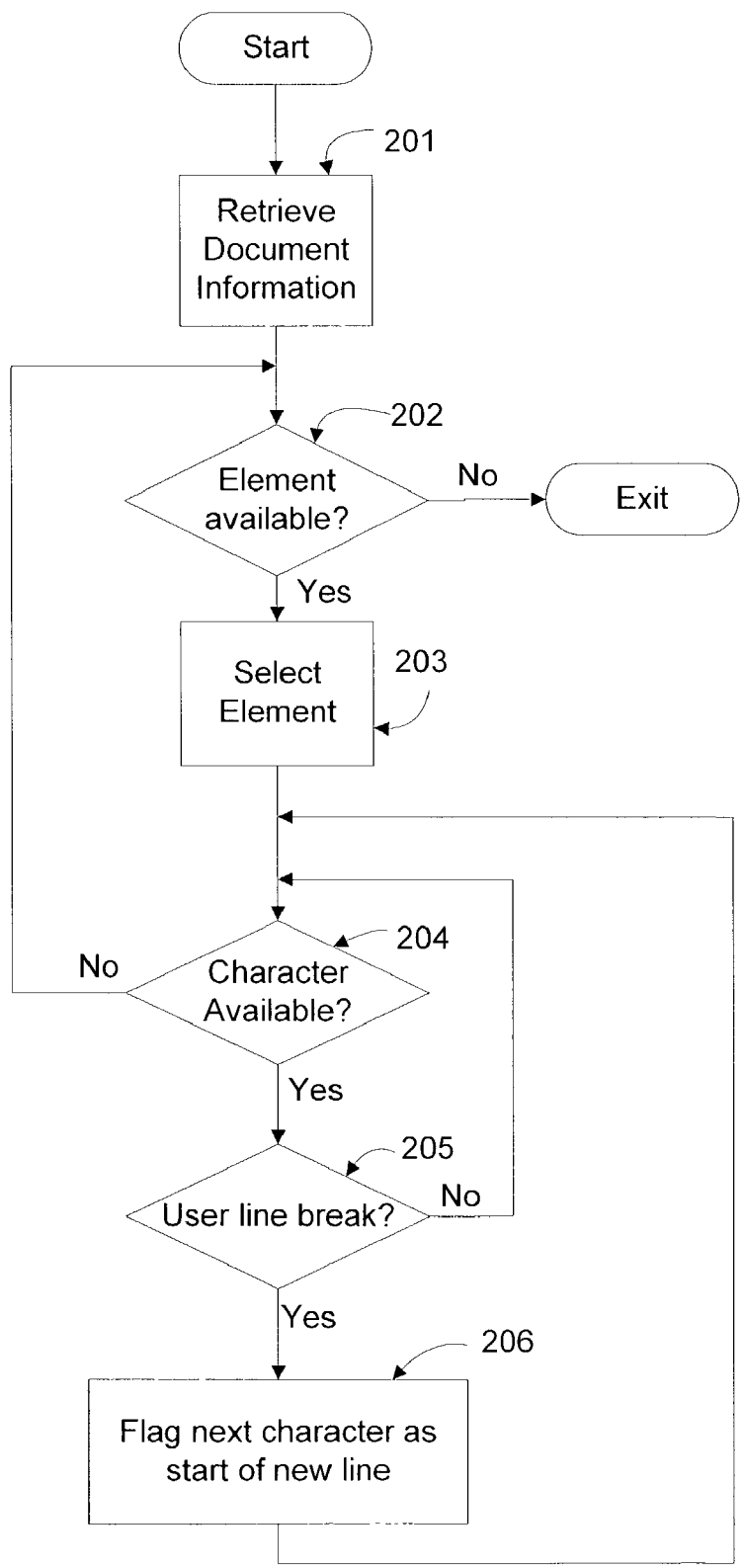
FIG. 2A shows a flow chart of a first portion of a method for identifying line breaks.
Figure 2B:
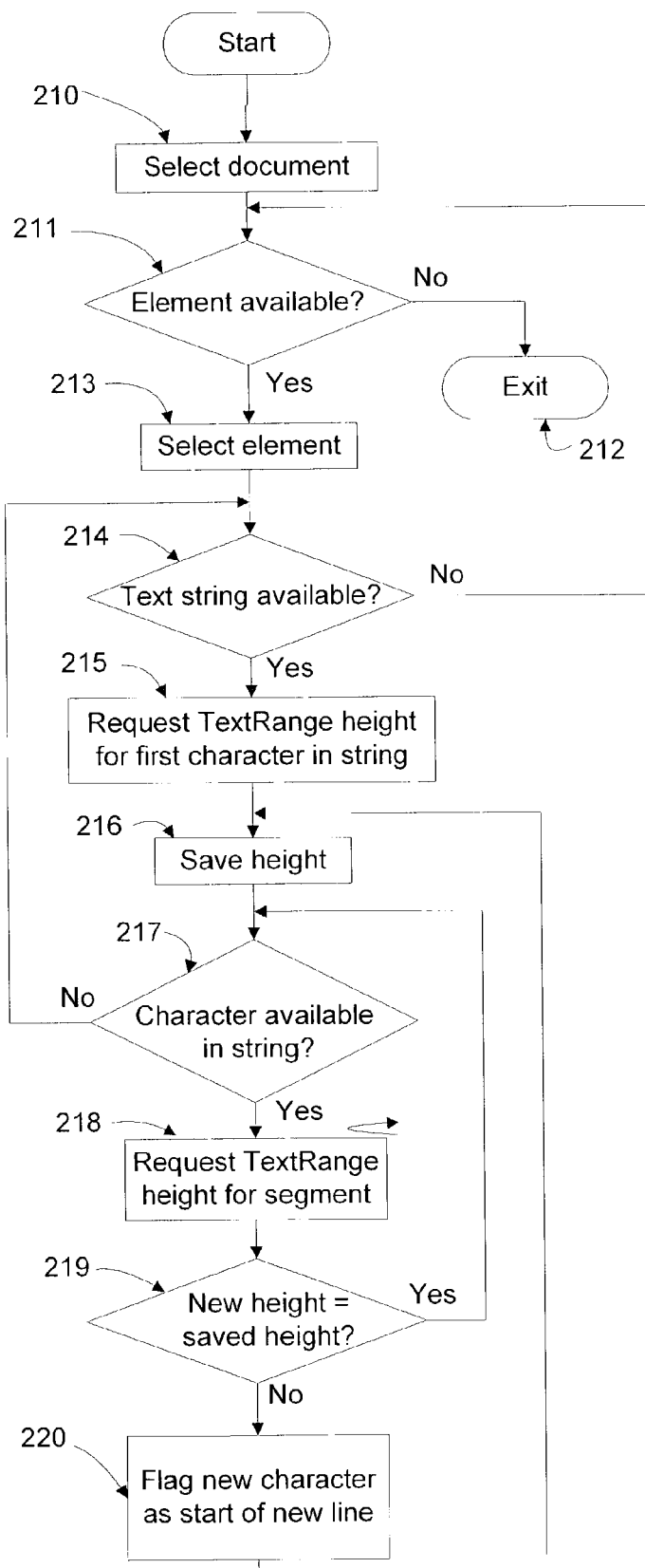
FIG. 2B shows a flow chart of a second portion of a method for identifying line breaks.

A preferred method for implementing the invention is shown in FIGS. 2A and 2B. In a preferred embodiment, the method is implemented in two steps: scanning the text elements in a document to locate all user controlled line breaks and scanning the text elements to locate all browser controlled line breaks. In a preferred embodiment, the information designating the location of both types of line breaks is maintained in a separate data structure.

FIG. 2A depicts a method for identifying user-inserted lines breaks. At step 201, the document description and information describing the specific browser in which the document was created are retrieved at step 201. If elements are available at step 202, an element is selected at step 203. All characters in the element are sequentially checked at steps 204–206. When no additional characters are available at step 204, the next element in the document is selected until all elements in the document have been examined. Whenever a break or paragraph character is detected at step 205, the next character in the text string is flagged as being the start of a new line. In a preferred implementation, the FIG. 2A method is performed at the time the XHTML document is parsed.

The method just described in connection with FIG. 2A takes the contents of a text element and identifies the location of any user-inserted line breaks. When these breaks, if any, have been identified, the user-inserted break information can be used to divide all of the text content of the element into strings of text characters that are between the user-inserted line breaks. Since one or all of these text strings may be long enough to require the browser to wrap the characters onto multiple lines, the method of FIG. 2B is directed to identifying any browser-imposed line breaks in these strings.

Referring to FIG. 2B, the document is selected at step 210 and an element from the document is selected at step 213. If the element contains a text string at step 214, the TextRange boundingHeight value for the bounding rectangle containing only the first character of the text string is initially requested. The boundingHeight value received at step 215 is saved at step 216. If there is another character in the text string at step 217, that character is added to the previous character and the TextRange boundingHeight value for that combined text segment is requested. The new height value is then compared to the saved height value at step 219. Steps 217–219 will be executed for each sequential character in the text string. As each character is added to the preceding characters, the boundingHeight value for the new text segment is obtained at step 218 and compared at step 219 to the saved value.

The height value obtained at step 218 will not change if the newly added character was rendered by the browser on the same line as the preceding character. The height value will change, however, when a character displayed on another line is added to the test segment. Therefore, when the new height is unequal to the saved height at step 219, it indicates that the character that was just added is at the beginning of a new line. In that event, the character is flagged at step 220 as starting a new line and the new height is saved at step 216. This new height will now be used to check for the next new line, if any, in the text string. Processing will continue in this fashion until the entire text string has been reviewed to identify all browser-imposed line breaks. Similarly, processing will continue until all text lines in all elements in the document have been processed. At the conclusion of the method, all line breaks, both user controlled and browser controlled, have been identified and the content of all character text lines is known.

Figure 3:
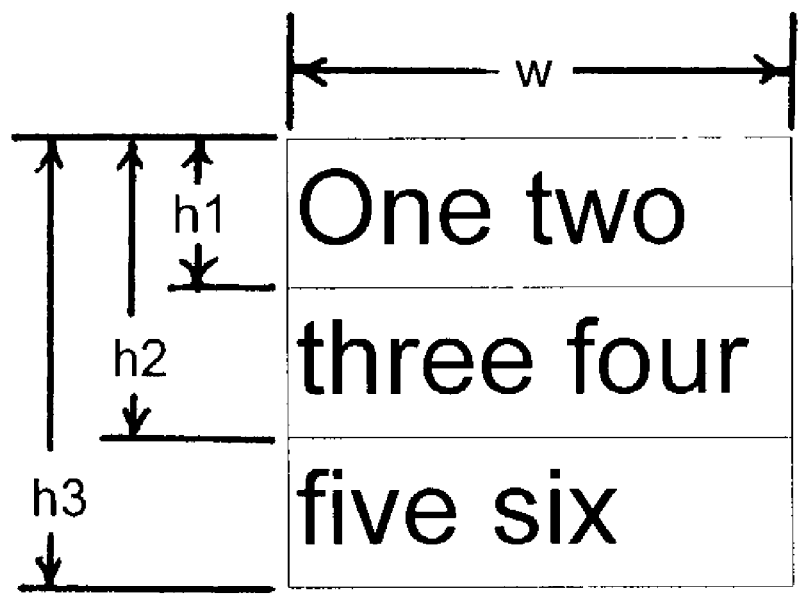
FIG. 3 is a depiction of an example text element containing wrapped text.

To illustrate the method of FIG. 2B, FIG. 3 shows an example of a text element as viewed by the user. As can be readily understood, the method can be applied to a document containing any number of text elements that contain any number and combination of characters, words, sentences and paragraphs. In this example, the user has entered text into a text area that has a width indicated by w. The user has entered the words "one two three four five six" into this area and, since there was insufficient horizontal space available to accommodate all of these words on a single line, the browser has wrapped the text onto three lines as shown. The XHTML document description as received at the server, however, contains the text string and specifies the width w, but does not indicate exactly where the text was divided.

Referring again to FIG. 2B, as applied to the example of FIG. 3, the document is retrieved at step 210 and the element is selected at step 213. The TextRange boundingHeight value of the text segment containing the first character, in this case the letter "o", is requested from the browser at step 215. The value returned, h1, is saved at step 216. At step 218, the boundingHeight value for the text segment "on" is requested and compared at step 219 with the saved value. The value will again be equal to h1, so the next character is added to the text segment and the boundingHeight value for "one" is requested. This process will continue until the boundingHeight for the text string segment "one two t" is requested. The boundingHeight value returned by the browser for this segment will be h2. The unequal comparison at step 219 will cause the "t" character that was just added to be flagged as the beginning of a new line. The value of h2 will be stored as the new saved height at step 216. The height values will again remain the same until the height of the segment "one two three four f" is requested. This will return a height of h3, indicating that another line has started. The "f" in "five" will be flagged as the start of a new line. Processing will continue through the last character and, since no other elements are available in this example, processing will terminate.

All lines of characters in the document and the location of all user controlled and browser controlled line breaks have now been identified. The XHTML document and the information about line breaks can now be provided to Rendering 103 for converting the document to a prepress format. In addition, knowing the location of the line breaks makes it possible to obtain additional useful information about the lines of text. For example, since the content of each line is known, the width of each line of text could be determined by submitting the text segment to the browser and requesting the TextRange boundingWidth value for that segment. Knowing the widths of the individual lines of text could then be used, if desired, to adjust intercharacter spacing on one or more lines of text in the document prior to printing to enhance the appearance of the final printed product.

The document and the identification of all line breaks are then forwarded to Rendering Program 103 for subsequent processing into a suitable prepress format. In a preferred embodiment for preparing a document to be printed on paper on a high-resolution printing press, subsequent processing includes rendering the text portion of the document with a commercial word processing program, such as Microsoft Word from Microsoft Corporation. The results from Microsoft Word are forwarded, via the "print" command, to a commercially available program, such as Acrobat Distiller from Adobe Systems Inc., for converting the word processing format into a high-resolution output format such as PDF. As a final step the non-text elements of the document and the text PDF are merged, using a commercially available product such as PDFlib from PDFlib GmbH, into a prepress document format. As will be appreciated by those of skill in the art, other commercially available software tools could also be used to create the PDF file and the specific prepress processing steps would vary depending on the specific medium onto which the document will be printed.

Figure 4:
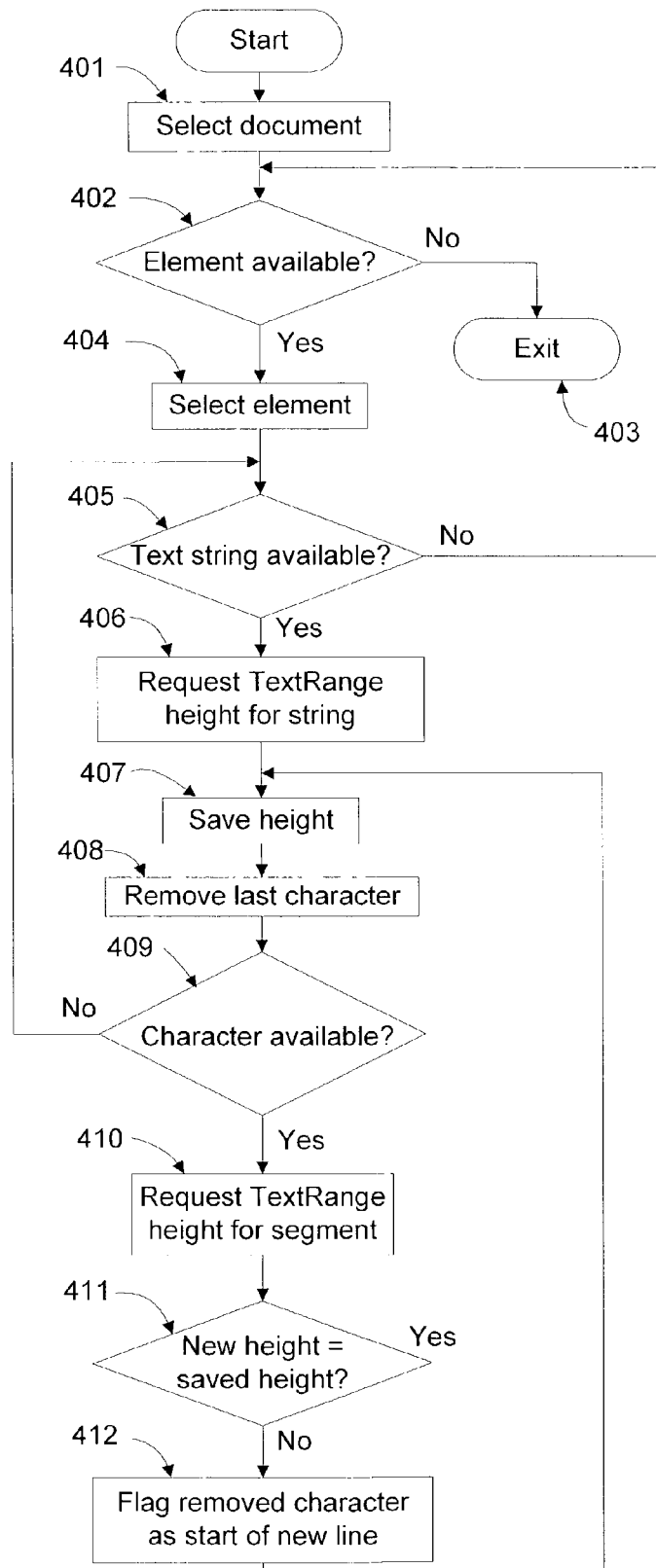
FIG. 4 is a flow chart of an alternate method for identifying browser imposed line breaks.

Various alternate implementations of the invention can be employed within the spirit and scope of the invention. For example, the method shown in FIG. 2B could be modified to work in the other direction. That is, referring to FIG. 4, the TextRange height of the entire text string would be obtained at step 406 and saved at step 407. Characters would then be individually removed at step 408. After each character is removed, the height value for the remaining segment could be compared at step 411 with the height value before the character was removed. When the values become unequal, it indicates that the last character that was removed was at the beginning of a line. That character would be flagged at step 412.

Figure 5:
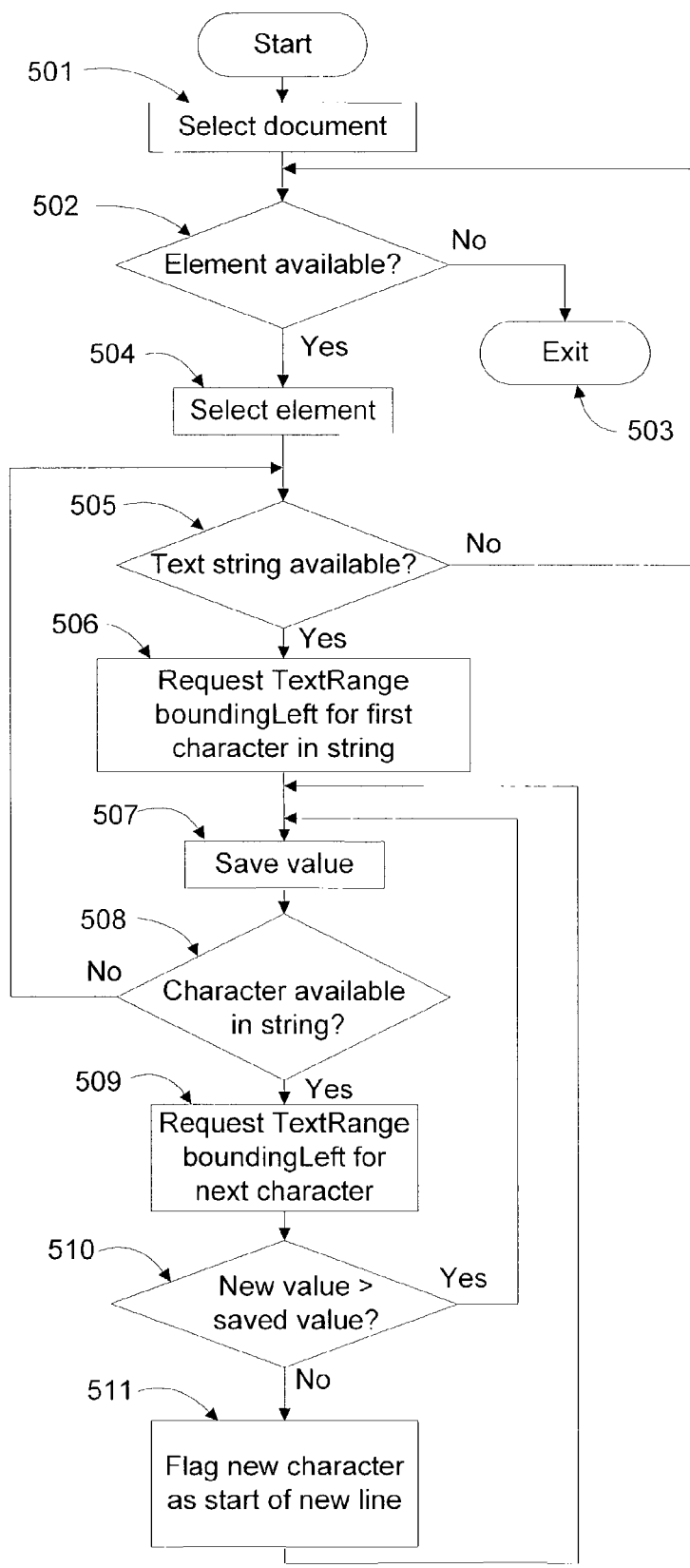
FIG. 5 is a flow chart of another alternate method for identifying browser imposed line breaks.

As another alternate implementation, another property of the TextRange object could be used to accomplish a similar result. FIG. 5 shows a method using the TextRange boundingLeft property, which returns the value of the left coordinate of the bounding rectangle. FIG. 5 is directed at a language such as English that has a normal direction of character progression from right to left. It will be understood that by changing step 510, the method of FIG. 5 can be readily adapted for use with those languages that have a direction of character progression from right to left.

At step 506 the boundingLeft value for the first character in the string is requested and saved at step 507. If the string contains more than a single character, the boundingLeft value for the next sequential character is obtained at step 509 and compared at step 510. Each succeeding character rendered by the browser on the same line will have a larger boundingLeft value than the preceding character. However, when a character in the string is encountered that has been wrapped to another line, the new boundingLeft value for that character will be less than the preceding character's value. In this event, the new character is flagged at step 511 as the beginning of a new line.

Figure 6:
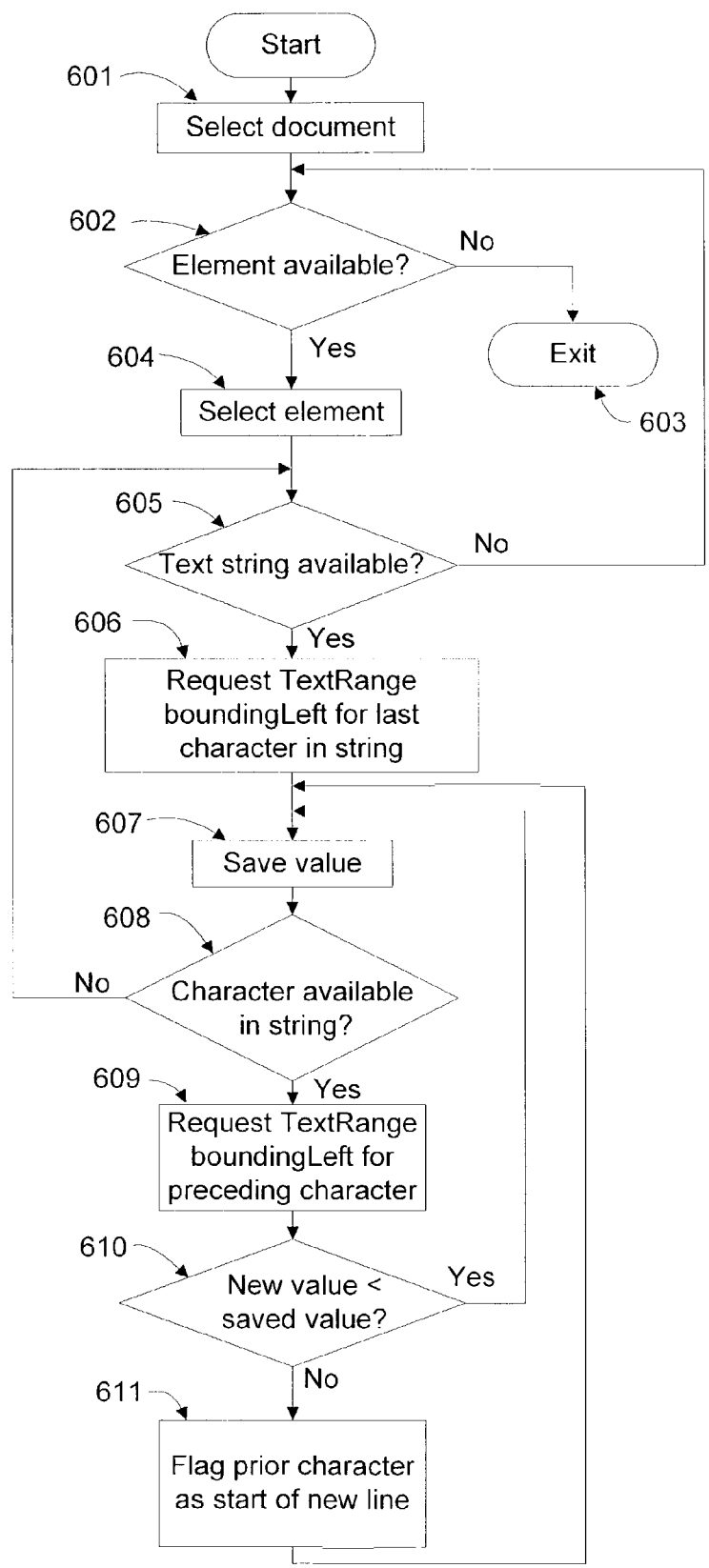
FIG. 6 is a flow chart of yet another alternate method for identifying browser imposed line breaks.

As yet another alternate implementation, FIG. 6 shows a method that is similar to FIG. 5, but operates in the reverse direction by comparing the TextRange boundingLeft property from the final character in the string back to the first character. With this approach, the boundingLeft value will decrease for characters rendered on the same line until the first character is compared with the last character on the preceding line. In this case, at step 610 the saved value of boundingLeft, which represents the value for the first character on one line, will be less than the value for the preceding character, which is the last character on the preceding line. This will cause the prior character to be flagged at step 611 as the start of a new line. As with FIG. 5 above, the method of FIG. 6 can be readily adapted to languages having a direction of character progression from right to left.

While various embodiments of the invention have been shown and described, the description is to be considered as illustrative rather than restrictive. The scope of the invention is as indicated in the following claims and all equivalent methods and apparatus.

What is claimed is:

1. A method for identifying browser-imposed line breaks in a string of characters in a markup language text element, the method comprising the steps of:
   a) for each character in the string, obtaining a value from the browser indicating the vertical position of that character as rendered by the browser, and
   b) far each character in the string after the first character,
      (i) comparing the vertical position of that character to the vertical position of the immediately preceding character in the string, and
      (ii) if the vertical positions of the two characters are not equal, identifying that character as starting a new line.

2. A method for identifying browser-imposed line breaks in a string of characters in a markup language text element, the method comprising the steps of:
   a) for each character in the string, obtaining a value from the browser indicating the horizontal position of that character as rendered by the browser, and
   b) for each character in the string after the first character,
      (i) comparing the horizontal position of that character to the horizontal position of the immediately preceding character in the string, and
      (ii) if the horizontal position of that character is not farther in the direction of normal character progression than the horizontal position of the immediately preceding character, identifying that character as starting a new line.

3. A method for identifying browser imposed line breaks in a character string of a markup language document for use in creating a prepress format version of the document, the method comprising the steps of
   a) defining a first string segment that contains only the initial character in the character string,
   b) defining a second string segment that contains the character content of the first string segment plus the next character in the string,
   c) comparing the height of the bounding rectangle of the first string segment with the height of the bounding rectangle of the second string segment,
   d) if the height of the second string segment is greater than the height of the first string segment, storing an indication that the character added in step b is at the beginning of a new line,
   e) setting the character content of the first segment equal to the character content of the second segment and repeating steps b–e until the character content of the first segment is set equal to the entire character string.

4. A method for identifying browser imposed line breaks in a character string of a markup language document for use in creating a prepress format version of the document, the method comprising the steps of:
   a) defining a first string segment that contains the character string,
   b) defining a second string segment that contains the character content of the first string segment minus the final character in the first string segment,
   c) comparing the height of the bounding rectangle of the first string segment with the height of the bounding rectangle of the second string segment,
   d) if the height of the first string segment is greater than the height of the second string segment, storing an indication that the character dropped in step b is at the beginning of a new line,
   e) setting the character content of the first segment equal to the character content of the second segment and repeating steps b–e until the first segment contains only a single character.

* * * * *